United States Patent [19]
Oosaka

[11] Patent Number: 5,625,468
[45] Date of Patent: Apr. 29, 1997

[54] FILM IMAGE INPUT SYSTEM WITH A GROUNDED CONDUCTIVE MEMBER CONTACTING A FILM PORTION OTHER THAN A PHOTOGRAPHIC EXPOSURE SURFACE, TO REMOVE UNWANTED STATIC ELECTRICITY

[75] Inventor: Shigenori Oosaka, Asaka, Japan

[73] Assignee: Fuji Photo Film Co., Ltd., Kanagawa, Japan

[21] Appl. No.: 374,859

[22] Filed: Jan. 19, 1995

[30] Foreign Application Priority Data

Jan. 20, 1994 [JP] Japan .................... 6-004662

[51] Int. Cl.⁶ .................... H04N 1/04; H05F 3/00
[52] U.S. Cl. .................... 358/487; 358/498; 361/220
[58] Field of Search .................... 358/498, 496, 358/474, 487, 527, 494, 506, 505; 355/75, 76, 311; 361/220, 221, 222, 223, 224

[56] References Cited

U.S. PATENT DOCUMENTS

| | | |
|---|---|---|
| 4,204,733 | 5/1980 | Modney et al. . |
| 4,218,801 | 8/1980 | Stewart . |
| 4,294,533 | 10/1981 | Bratt et al. . |
| 4,395,793 | 8/1983 | Wedel et al. . |
| 4,452,173 | 6/1984 | Tabuchi et al. . |
| 4,592,649 | 6/1986 | Freitag et al. . |
| 4,737,809 | 4/1988 | Konno . |
| 5,138,371 | 8/1992 | Benker et al. . |
| 5,150,273 | 9/1992 | Levantine .................... 361/220 |

FOREIGN PATENT DOCUMENTS

| | | |
|---|---|---|
| 522656 | 1/1993 | Japan . |
| 575922 | 3/1993 | Japan . |
| 556345 | 3/1993 | Japan . |
| WO9004301 | 4/1990 | WIPO . |

*Primary Examiner*—Scott A. Rogers

[57] ABSTRACT

A photographic film is prevented from being damaged by dust adhering thereto due to static electricity generated in the photographic film during the feeding thereof. A brush for removing the static electricity as being a conductive member is brought into contact with a portion of the photographic film other than a photographic exposure surface. Furthermore, the brush is grounded through a line to a casing of a film image input system, which has electric potential 0. With this arrangement, the static electricity generated in the photographic film during the feeding thereof can be removed through the line from the brush for removing the static electricity. Thus, the static electricity is not accumulated in the photographic film and the dust does not adhere to the photographic film. Therefore, the photographic film can be prevented from being damaged by the dust.

15 Claims, 3 Drawing Sheets

1

FILM IMAGE INPUT SYSTEM WITH A GROUNDED CONDUCTIVE MEMBER CONTACTING A FILM PORTION OTHER THAN A PHOTOGRAPHIC EXPOSURE SURFACE, TO REMOVE UNWANTED STATIC ELECTRICITY

BACKGROUND OF THE INVENTION

1. Field of the Invention

This invention relates to a film image input system, and more particularly to a film image input system, wherein an image of a developed photographic film is made to focus at an image sensor through a taking lens, and image signals, which are photo-electrically transduced by the image sensor, are output to a monitor television, so that the film image can be displayed on the monitor television.

2. Description of the Related Art

A film image input system wherein a developed photographic film in continuous form is taken by an image sensor such as a CCD (Charge Coupled Device), and an image of the photographic film is transduced into image signals, which are output to a monitor television, so that the film image can be displayed, is well known by WO90/04301, Japanese Patent Laid-Open No. 1993-75922, 1993-56345, 1993-22656 and so forth.

In WO90/04301, there are disclosed a camera and a film image input system, which use a photographic film having a magnetic recording track. Further in Patent Laid-Open No. 1993-75922, there are disclosed a film image input system and the like, which use a film cartridge, in which a developed photographic film is wound around a single spool.

Furthermore, in Patent Laid-Open No. 1993-22656, there is disclosed a film image input system, in which when preparation of multiple image surfaces is instructed; a developed photographic film is fed frame by frame; image data of each frame are taken in through an image sensor; and the image data of each frame are compressed and stored in an image memory for one image surface. Thereby an index image can be displayed on a monitor television on the basis of the image data stored in this image memory.

However, the conventional film image input system presents such disadvantages that, whenever the photographic film is used, the photographic film tends to be damaged. Thus, damages are taken by the image sensor and displayed on the monitor television, so that satisfactory film images cannot be obtained.

SUMMARY OF THE INVENTION

The present invention has been developed in view of the aforementioned disadvantages of the prior art described hereinabove and has as its object the provision of a film image input system, in which a photographic film is not damaged.

To achieve the above-described object, the present invention is characterized in that, in a film image input system wherein a developed photographic film in continuous form is fed along a guide member in the longitudinal direction, and an image of the photographic film is made to focus at an image sensor through a taking lens, a conductive member is brought into contact with a portion of the photographic film other than a photographic exposure surface, and the conductive member is grounded, so that static electricity generated in the photographic film can be removed through the conductive member.

According to the present invention, it has been ascertained that the cause of the damages of the photographic film is attributed to the dust adhering to the photographic film which damages the photographic film during the wind-up of the photographic film. The cause of the adherence of the dust to the photographic film is attributed to the static electricity accumulated in the photographic film due to the friction caused between the photographic film and a guide member during the feeding of the photographic film.

According to the present invention, on the basis of the above-described causes, the conductive member is brought into contact with the portion of the photographic film other than the photographing exposure surface of the photographic film. Thus, the damage caused to the photographing exposure surface of the photographic film by the conductive member can be prevented. Further, this conductive member is grounded, so that the static electricity generated in the photographic film can be removed through the conductive member.

With this arrangement, according to the present invention, the static electricity is not accumulated in the photographic film. Thereby the dust does not adhere to the photographic film, so that the photographic film can be prevented from being damaged.

Furthermore, according to the present invention, compressed air is blown out of an air blow-out device toward the photographic film, so that the dust adhering to the photographic film can be forcibly removed.

With this arrangement, according to the present invention, the dust adhering to the photographic film due to the causes other than the static electricity can be removed, so that the photographic film can be further prevented from being damaged.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

Detailed description will hereunder be given of the preferred embodiments of a film image input system according to the present invention with reference to the accompanying drawings.

Figure 1:
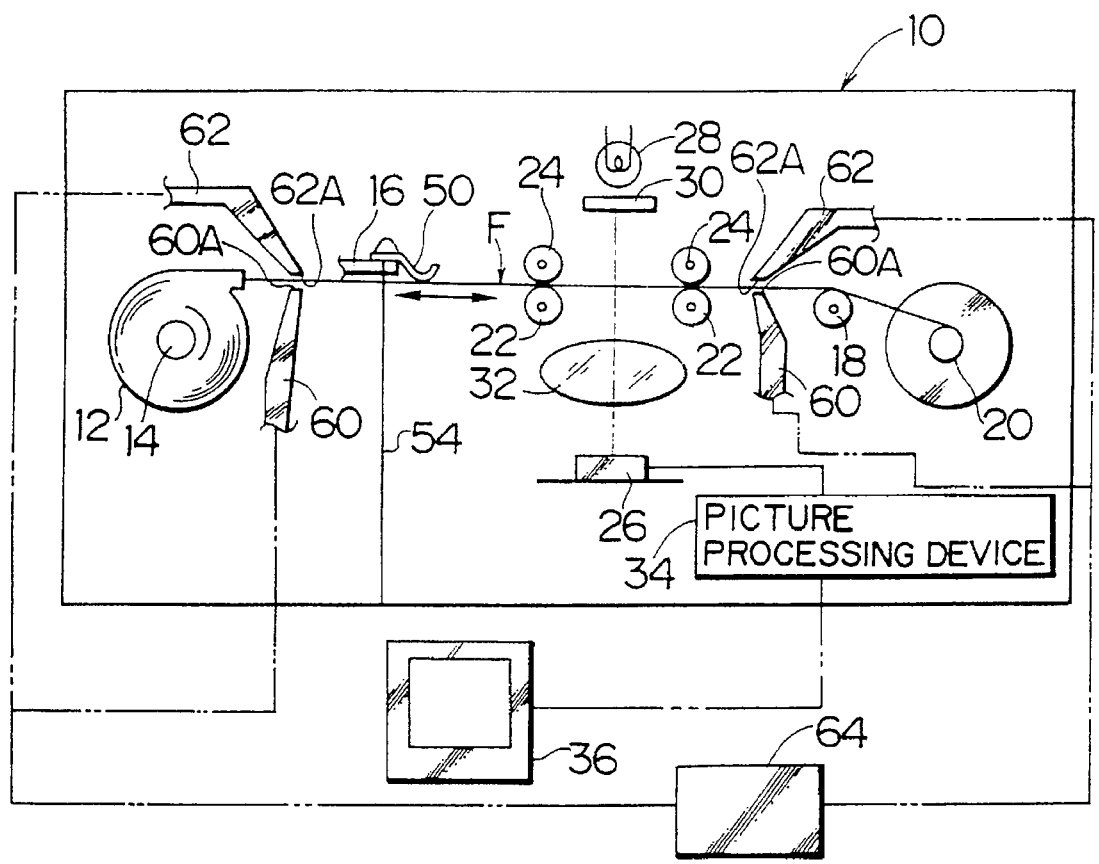
FIG. 1 is a structural view showing a first embodiment of the film image input system according to the present invention.

FIG. 1 is the structural view showing one embodiment of the film image input system according to the present invention.

A film cartridge 12 is mounted in a casing 10 of the above-mentioned film image input system. A developed photographic film is previously wound around a spool 14 in the above-mentioned film cartridge 12, and this photographic film F is mounted by a predetermined value by a film driving mechanism from the film cartridge 12. Thus, unwound photographic film F is fed by being guided by guide members 16 and 16 shown in FIG. 2, passed to a pass roller 18, and wound up by a wind-up spool 20.

As shown in FIG. 1, the above-mentioned film driving mechanism is engaged with the spool 14 of the film cartridge 12, and includes: a film supplying section for forwardly or reversely driving the spool 14; a film wind-up section engageable with the wind-up spool 20, for winding up the photographic film F delivered from the above-mentioned film supplying section; and a film feeding section disposed in a feeding path of the photographic film F, for feeding the photographic film F at a predetermined speed while clamping the photographic film F between capstans 22, 22 and pinch rollers 24, 24.

The above-mentioned film supplying section drives the spool 14 of the film cartridge 12 in the clockwise direction in the drawing, and feeds the photographic film F out of the film cartridge 12 until completion of wind-up of the forward end of the photographic film F by the wind-up spool 20 of the film wind-up section. Further, a clutch mechanism for controlling the rotation of the spool 14 is provided in the film supply section, and the photographic film F is fed with a predetermined tension by actions of this clutch mechanism and the driving force of the above-mentioned capstans 22 and 22.

Furthermore, a CCD line sensor 26 is provided at a position downwardly of a space formed between the capstans 22 and 22. This CCD line sensor 26 is disposed in a direction intersecting perpendicularly the feeding direction of the photographic film F, and reads out a transmitted image of the photographic film F, which is irradiated by a light source through an infrared ray cut filter 30 by way of a taking lens 32. Furthermore, electric signals transduced by photo-electric transducer elements of the CCD line sensor 26 are picture-processed by a picture processing device 34, and thereafter, output as image signals to a monitor television 36. With this arrangement, an image of the photographic film F is displayed on the monitor television 36.

Figure 2:
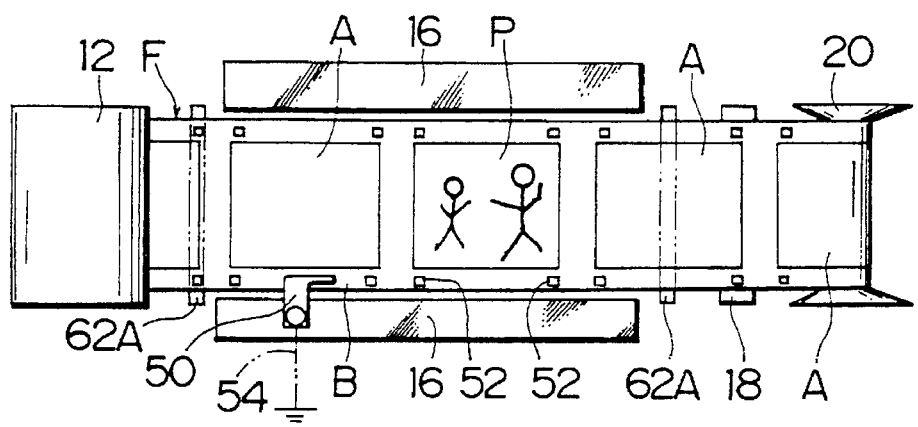
FIG. 2 is a plan view of FIG. 1.

On the other hand, a brush 50 for removing static electricity as being a conductive member is disposed at a position close to the film cartridge 12. As shown in FIG. 2, this brush 50 is brought into contact with a portion B of the photographic film F (a portion where perforations 52 are provided) other than a photographic exposure surface A of the photographic film F. Furthermore, the brush 50 is grounded to a casing 10 of the film image input system, which has an electric potential 0, through a line 54. The contact pressure of the brush 50 is set at a value above the pressure value for releasing the static electricity generated in the photographic film F.

Furthermore, as shown in FIG. 1, air blow-out nozzles 60 and 62 are provided vertically on the both sides of the feeding path of the photographic film F, interposing the photographic film F therebetween. An air blow-out opening 60A of the above-mentioned air blow-out nozzle 60 is provided, while being directed toward an emulsion surface of the photographic film F, and an air blow-out opening 62A of the air blow-out nozzle 62 is provided, while being directed toward a base of the photographic film F. These air blow-out openings 60A and 62A are connected to a compressor device 64, whereby the compressed air is supplied from the compressor device 64.

In the film image input system thus constructed, the static electricity is generated in the photographic film F due to the friction between the photographic film F and the guide members 16 and 16 during the feeding of the photographic film F. However, this static electricity is removed from the brush 50 for removing the static electricity through the line 52.

With this arrangement, in this embodiment, the static electricity is not accumulated in the photographic film F, whereby the dust does not adhere to the photographic film F. Thus, the photographic film F can be prevented from being damaged by the dust. Furthermore, in this embodiment, the above-mentioned brush 50 is brought into contact with the portion B other than the photographic exposure surface A of the photographic film F, so that the photographic exposure surface A of the photographic film F can be prevented from being damaged by the brush 50.

Further, in this embodiment, when the compressed air is blown out toward the photographic film F from the blow-out openings 60A and 62A of the air blow-out nozzles 60 and 62, the dust which drops onto the photographic film F and adheres thereto, can be forcibly removed. With this arrangement, in this embodiment the dust adhering to the photographic film F due to the causes other than the static electricity can be removed.

Figure 3:
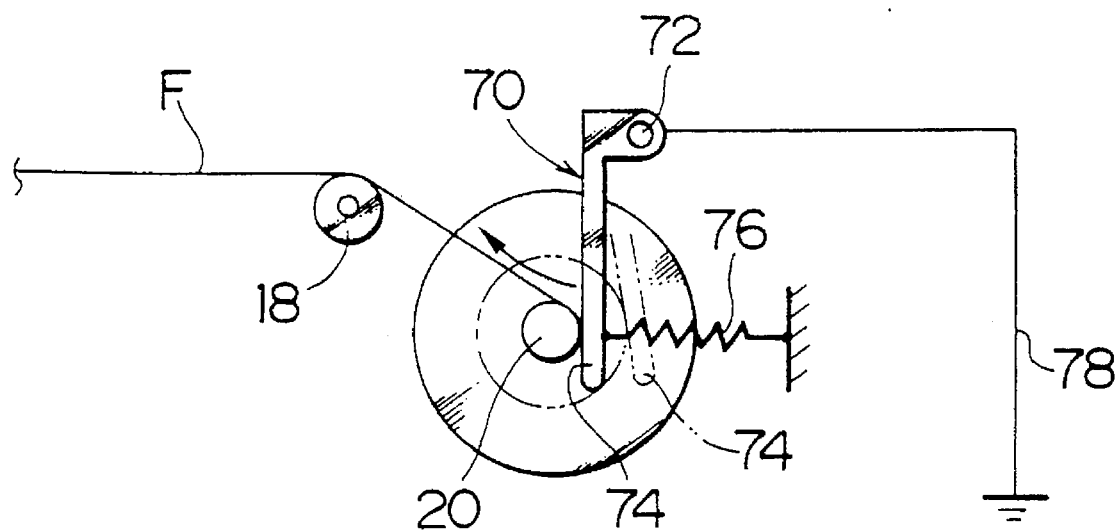
FIG. 3 is a structural view of the essential portions showing a second embodiment of the film image input system according to the present invention.
Figure 4:
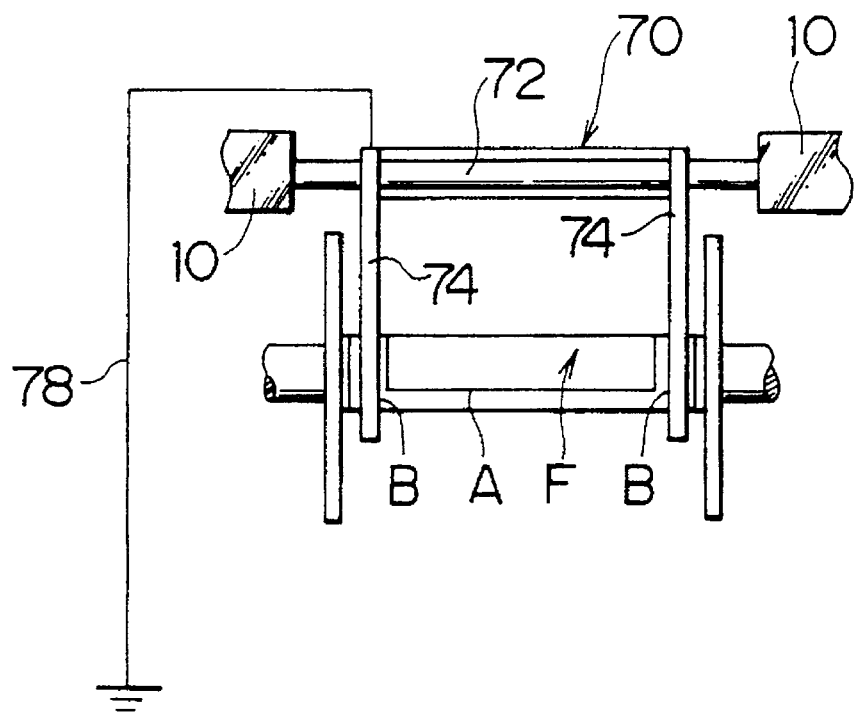
FIG. 4 is a right side view of FIG. 3.

FIG. 3 is the structural view of the essential portions showing the second embodiment of the film image input system according to the present invention. FIG. 4 is the right side view of FIG. 3.

In the above-mentioned second embodiment, a film push plate for pushing the photographic film F wound around the wound-up spool 20 against the wind-up spool 20 is additionally used as a conductive member.

A top end portion of a conductive member 70 in this embodiment is pivotally supported by a shaft 72. Furthermore, arms 74 and 74 which extend from the opposite sides of the conductive member 70 are brought into pressing contact with the portion B of the photographic film F other than the photographic exposure surface A through an urging force of a compression spring 76. Accordingly, the above-mentioned conductive member 70 is rotated in the counter-clockwise direction in FIG. 3 against the urging force of the above-mentioned compression spring 76 as the diameter of the photographic film F to be wound up by the wind-up spool 20 is increased. Furthermore, the conductive member 70 is rotated in the clockwise direction in FIG. 3 through the urging force of the compression spring 76 as the diameter of the photographic film F to be unwound from the wind-up spool 20 is decreased. With this arrangement, the conductive member 70 is in a state where the conductive member 70 is constantly in pressing contact with the photographic film F.

In the second embodiment thus constructed, similar to the first embodiment shown in FIGS. 1 and 2, the static electricity generated in the photographic film F can be removed from the conductive member 70 through a grounded line 78, so that the photographic film F can be prevented from being damaged by the dust.

Figure 5:
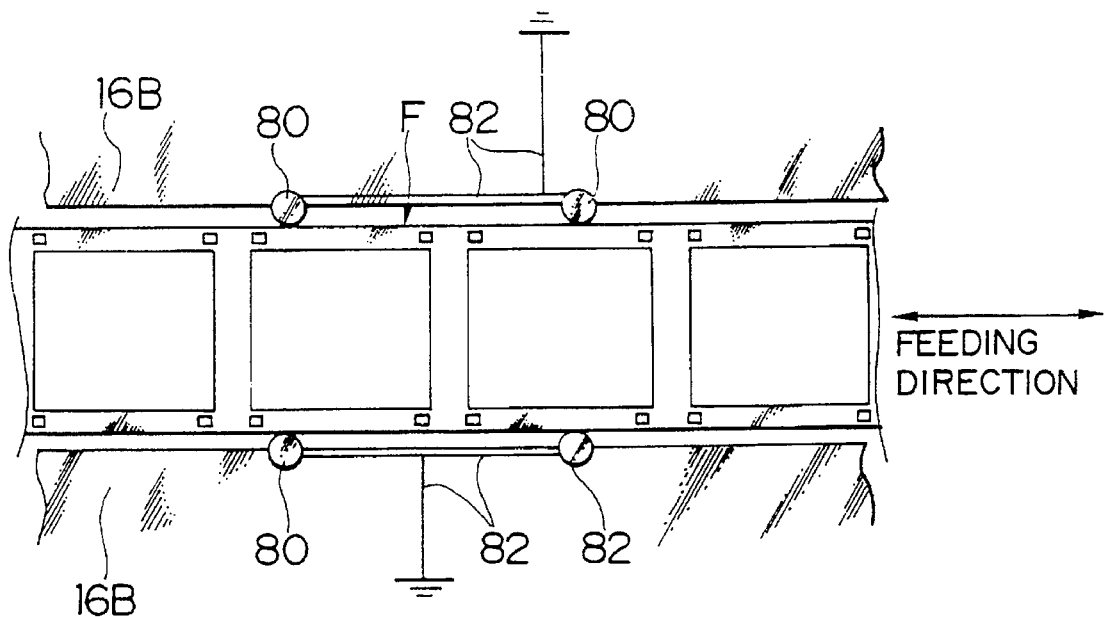
FIG. 5 is a plan view of the essential portions showing a third embodiment of the film image input system according to the present invention.

FIG. 5 is the structural view of the essential portions showing the third embodiment of the film image input system according to the present invention. In the third embodiment, four conductive pins 80, 80 ... being in contact with opposite edge surfaces of the photographic film F are erected on guide members 16A an 16B at predetermined intervals, whereby the static electricity generated in the photographic film F is grounded from the above-mentioned pins 80, 80 ... through a line 82. In this third embodiment, the photographic film F can be prevented form being damaged by the dust in the same manner as in the above-mentioned first and second embodiments and advancing in the oblique direction of the photographic film F during the feeding thereof can be corrected by the above-described pins 80, 80 ...

Figure 6:
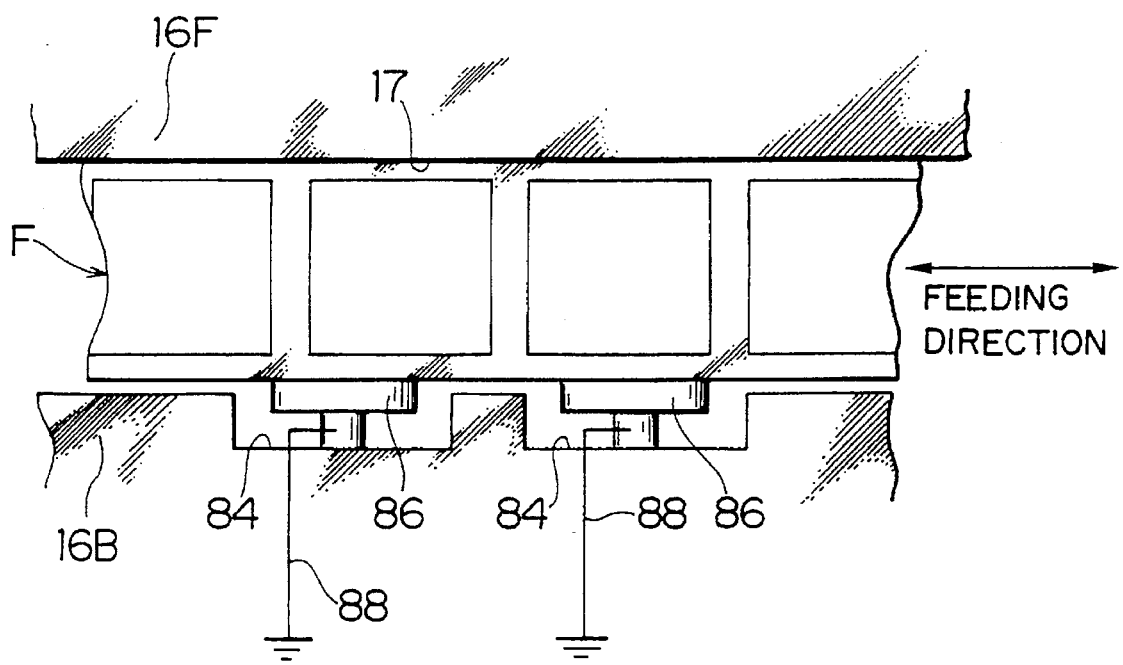
FIG. 6 is a plan view of the essential portions showing a fourth embodiment of the film image input system according to the present invention.

FIG. 6 is the structural view of the essential portions showing the fourth embodiments of the film image input system according to the present invention. In the fourth embodiment, recessed portions 84 and 84 are formed in the guide member 16B at a predetermined interval, conductive flanges 86,86 ... being in contact with the edge surface on one side of the photographic film F are provided in these recessed portions 84 and 84, and the static electricity generated in the photographic film F is removed from the above-mentioned flanges 6, 86 ... through grounded lines 88 and 88. In this fourth embodiment, in the same manner as in the first through third embodiments, the photographic film F can be prevented from being damaged by the dust and the advancing in the oblique direction of the photographic film F during the feeding thereof can be corrected by the flanges 86, 86 ... and an end surface 17 of the guide member 16A.

As for the photographic film F used in the first through fourth embodiments, there may be adopted a conventional one, in which the base is formed of acetate or polyester, and another one, in which polyethylene naphthalate is heat-treated to obtain more stiffness and more durability than the conventional base. Furthermore, the above-mentioned polyethylene naphthalate is heat-treated at a temperature less than 50° C. ~ glass transition temperature (Tg) for 0.1~1500 hours, and thereafter, is used as a base material.

Furthermore, in this embodiment, the CCD line sensor 26 has been used as the image sensor, however, a CCD area sensor may be used.

Further, as the conductive members other than those described in this embodiment, conductive members such as the capstans 22 and the pinch rollers 24, and a member such as the guide member 16, in which plating is applied to a conveying path made of synthetic resin to make it conductive, are used, whereby the static electricity generated in the photographic film F can be grounded. Furthermore, when the above-mentioned conveying path as a whole is made of conductive resin, the conveying path as a whole can be used as the ground, whereby it is not necessary to ground the conveying path. In these cases, the static electricity can be removed by use of the existing structural members of the film image input system, so that such an advantage can be achieved that the provision of another conductive member can be dispensed with.

Furthermore, in this embodiment, the film image input system has been described, however, the invention should not necessarily be limited to this, and the invention may be applied to a camera with magnetic information recording function, a microfilm conveying system for information retrieval, a film conveying system for movie films, and the like.

As has been described hereinabove, in the film image input system according to the present invention, it is ascertained that the cause of the damage of the photographic film is attributed to the static electricity accumulated in the photographic film, the conductive member is brought into contact with the portion of the photographic film other than the photographic exposure surface, this conductive member is grounded, and the static electricity generated in the photographic film is removed through the conductive member; Thus, the static electricity is not accumulated in the photographic film and the dust does not adhere to the photographic film. Accordingly the photographic film can be prevented from being damaged.

Furthermore, according to the present invention, the compressed air is blown out of the air blow out means toward the photographic film so as to remove the dust adhering due to cause other than the static electricity, so that the photographic film can be prevented from being damaged.

It should be understood, however, that there is no intention to limit the invention to the specific forms disclosed, but on the contrary, the invention is to cover all modifications, alternate constructions and equivalents falling within the spirit and scope of the invention an expressed in the appended claims.

What is claimed is:

1. A film imaging system comprising:

a guide member for feeding a developed photographic film in continuous form in a longitudinal direction;

an image sensor for imaging the photographic film conveyed along said guide member; and a conductive member, contacting a portion of the photographic film other than a photographic exposure surface, the conductive member being grounded to remove static electricity generated during the feeding of the photographic film.

2. A film image input system as set forth in claim 1, wherein said conductive member is mounted on said guide member.

3. A film imaging system as set forth in claim 1, wherein said conductive member is provided at a position proximate to a wind-up spool for winding up the photographic film fed along said guide member after imaging.

4. A film imaging system as set forth in claim 3, wherein said conductive member is linearly movable to and from said wind-up spool and is urged by an urging means for pressing the conductive member into contact with said portion of the photographic film.

5. A film imaging system as set forth in claim 1, wherein said conductive member includes guide pins, contacting opposite edge surfaces of said portion of the photographic film in the longitudinal direction, and preventing said photographic film from advancing in an oblique direction during the feeding thereof.

6. A film imaging system as set forth in claim 1, wherein said conductive member includes at least one of a capstan and a pinch roller, for conveying said photographic film at a predetermined speed.

7. A film imaging system as set forth in claim 1, wherein said conductive member includes at least a portion of said guide member plated with a synthetic resin.

8. A film imaging system as set forth in claim 1, wherein said conductive member is grounded by casing housing said film image input system.

9. A film imaging system as set forth in claim 1, further comprising:

air blow-out means for blowing out compressed air toward said photographic film to remove dust adhering to said photographic film.

10. The film imaging system of claim 1, further comprising:

processing means for processing the image; and display means for displaying the processed image.

11. The film imaging system of claim 10, wherein the conductive member contacts the portion of the photographic film prior to imaging by the image sensor.

12. The film imaging system of claim 9, wherein the air blow-out means includes a plurality of air blow nozzles.

13. The film imaging system of claim 9, wherein the air blow-out means blows out compressed air toward said photographic film prior to imaging by the image sensor.

14. The film imaging system of claim 12, wherein at least one of the plurality of air blow nozzles blows out compressed air toward the photographic film prior to imaging by the image sensor.

15. The film imaging system of claim 14, wherein the plurality of air blow nozzles includes at least two nozzles, one blowing air on each of two different surfaces of the photographic film.

\* \* \* \* \*